Patented June 29, 1954

2,682,545

UNITED STATES PATENT OFFICE 2,682,545

CHLORINATION OF DIHYDROTHIONAPHTHENE SULFONE

John E. Mahan, Bartlesville, Okla., and Alvin C. Rothlisberger, Borger, Tex., assignors to Phillips Petroleum Company, a corporation of Delaware No Drawing. Application August 30, 1951, Serial No. 244,470

4 Claims. (Cl. 260—332.1)

This invention relates to halogenated polycyclic sulfones and to a method for their preparation. In one of its more specific aspects this invention relates to novel halogenated derivatives of a 3a,7a-dihydrothionaphthene sulfone and to a method for the preparation thereof.

Heretofore halogenated derivatives of a 3a,7a-dihydrothionaphthene sulfone have been unknown. Accordingly it is an object of this invention to prepare these materials and to provide a method for their preparation. These and other objects of the invention will become apparent in the light of the accompanying disclosure.

It has now been found that halogenated derivatives of a 3a,7a-dihydrothionaphthene sulfone are prepared by reacting a 3a,7a-dihydrothionaphthene sulfone with a halogen selected from the group consisting of chlorine and bromine. Throughout this specification and in accordance with our invention by a 3a,7a-dihydrothionaphthene sulfone is meant not only the compound 3a,7a-dihydrothionaphthene sulfone but also its various substituted derivatives, as may be represented by the following structural formula

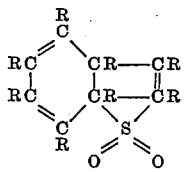

wherein R is a hydrogen atom or an alkyl, aryl, alkaryl, aralkyl or cycloalkyl radicals, wherein the total number of carbon radicals present in any such radical is not greater than 12. Preferably the total number of carbon atoms present in the above-indicated structural formula is not greater than 32. The substituent radicals include the variols alkyl radicals such as methyl, ethyl, propyl, tert-butyl, amyl, octyl; the various cycloalkyl radicals such as cyclopropyl, cyclobutyl, cyclopentyl, cyclohexyl; the various aryl, alkaryl and aralkyl radicals such as phenyl, benzyl, tolyl, xylyl, cumenyl, etc. as well as the higher and lower molecular weight homologs of the above radicals. The preferred starting material for the preparation of halogenated 3a,7a-dihydrothionaphthene sulfone derivatives according to the invention is the compound 3a,7a-dihydrothionaphthene sulfone itself, having the empirical formula $C_8H_8O_2S$ and as is represented by the structural formula

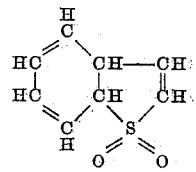

The preparation of 3a,7a-dihydrothionaphthene sulfone which is used in the practice of this invention is fully described in the copending patent application of J. E. Mahan, filed October 25, 1951, Serial No. 253,200.

The reaction between a halogen such as chlorine and/or bromine to produce halogenated 3a,7a-dihydrothionaphthene sulfone derivatives in accordance with our invention is carried out under the following conditions; reaction temperature, —20° to 100° C., preferably between 0° and 35° C.; reaction time, between about 0.5 and 50 hrs.; reaction pressure, not less than that required to maintain the sulfone and solvent employed in the liquid phase at the reaction temperature. It is preferred to employ a solvent, such as chloroform, carbon tetrachloride, ether, or other inert liquid solvent for the sulfone to be halogenated. The mol ratio of solvent to sulfone may vary from 1 to 20 or even higher, depending upon the solubility characteristics of the sulfone and other reaction conditions. The halogenation agent, preferably chlorine, is added to the reaction mixture as by bubbling therethrough, at such a rate that the desired product is obtained. The sulfone starting material hereinbefore referred to and described may also contain some isomeric 2,3-dihydrothionaphthene sulfone.

The reaction taking place between the chlorine and bromine or other suitable halogenating agent such as iodine chloride, is primarily the addition of halogen (chlorine if chlorine is used) to the sulfone probably by addition to the carbon-to-carbon double bonds. It is also possible that some substitutive halogenation may take place. The halogenated product which is obtained may vary in its halogen content and may contain, for example 2, 4 or 6 halogen atoms.

Reaction conditions such as temperature and length of reaction period may be varied to yield the desired degree of halogenation.

The halogenated 3a,7a-dihydrothionaphthene sulfones have been found to be useful as fungicides and as herbicides. The materials are also useful as intermediates in the field of pharmaceutical chemicals and the like as well as antioxidants, lubricating oil additives and wax modifiers. The tetrachloro derivative of 3a,7a-dihydrothionaphthene sulfone as represented by the empirical formula $C_8H_8Cl_4O_2S$ has been found to be fungicidal toward G. cingulata and A. oleracea and has also been found to exhibit some herbicidal activity when tested on sprouting rice.

The following example also explains and illustrates the invention.

Example

The chlorination of 3a,7a-dihydrothionaphthene sulfone was carried out as follows: 3.46 grams of the sulfone was dissolved in 30.24 grams of chloroform and cooled to ice temperature. Chlorine was slowly bubbled through the solution. An excess of chlorine was added and the mixture was allowed to stand overnight at ice temperature, the total reaction time being 16 hours.

The excess chlorine and the chloroform were stripped from the reaction mixture under vacuum. The semi-solid, light yellow, chlorinated product weighed 6.91 grams. The material had a sweet, flowery odor and was soluble in ethyl alcohol, ether and benzene. It was slightly soluble in isooctane and practically insoluble in water. The material was analyzed and was found to contain 46.7 weight per cent chlorine. The theoretical amount of chlorine in the tetrachloro derivative (empirical formula $C_8H_8Cl_4O_2S$) is 45.75 per cent by weight chlorine.

As will be evident to those skilled in the art upon reading this disclosure many modifications, changes and substitutions may be made without departing from the spirit or scope of this invention.

We claim:

1. A tetrachloro derivative of 3a,7a-dihydrothionaphthene sulfone having the empirical formula $C_8H_8Cl_4O_2S$ and prepared by reacting 3a,7a-dihydrothionaphthene sulfone with chlorine.

2. A tetrahalogenated derivative of 3a,7a-dihydrothionaphthene sulfone having the empirical formula $C_8H_8X_4O_2S$ wherein X is a halogen atom selected from the group consisting of chlorine and bromine and prepared by reacting 3a,7a-dihydrothionaphthene sulfone with a halogen selected from the group consisting of chlorine and bromine.

3. A tetrabromo derivative of 3a,7a-dihydrothionaphthene sulfone having the empirical formula $C_8H_8Br_4O_2S$ and prepared by reacting 3a,7a-dihydrothionaphthene sulfone with bromine.

4. A tetrahalogenated derivative of 3a,7a-dihydrothionaphthene sulfone having the empirical formula $C_8H_8X_4O_2S$ wherein X is a halogen atom selected from the group consisting of chlorine and bromine and wherein said tetrahalogenated derivative is prepared by reacting the said 3a,7a-dihydrothionaphthene with a halogenating agent which yields a halogenated derivative containing said halogen.

References Cited in the file of this patent

Challenger et al.: J. C. S., 1948 (II), pp. 615–18.
Bordwell et al.: J. A. C. S., 70, 1558–60 (1948).
Bordwell et al.: J. A. C. S., 71, 1702–5 (1949).
Bordwell et al.: J. A. C. S., 72, 1985–8 (1950).